(12) United States Patent
Shah et al.

(10) Patent No.: US 9,811,388 B2
(45) Date of Patent: Nov. 7, 2017

(54) VSYNC ALIGNED CPU FREQUENCY GOVERNOR SAMPLING

(71) Applicant: Qualcomm Innovation Center, Inc., San Diego, CA (US)

(72) Inventors: Premal Shah, San Diego, CA (US); Rajulu Ponnada, Hyderabad (IN); Omprakash Dhyade, San Diego, CA (US)

(73) Assignee: QUALCOMM Innovation Center, Inc., San Diego, CA (US)

(*) Notice: Subject to any disclaimer, the term of this patent is extended or adjusted under 35 U.S.C. 154(b) by 106 days.

(21) Appl. No.: 15/072,248

(22) Filed: Mar. 16, 2016

(65) Prior Publication Data

US 2016/0335737 A1 Nov. 17, 2016

Related U.S. Application Data

(60) Provisional application No. 62/161,656, filed on May 14, 2015.

(51) Int. Cl.
*G06F 9/54* (2006.01)
*G06F 9/50* (2006.01)

(52) U.S. Cl.
CPC ............ *G06F 9/5083* (2013.01); *G06F 9/54* (2013.01); *G06T 2200/28* (2013.01)

(58) Field of Classification Search
None
See application file for complete search history.

(56) References Cited

U.S. PATENT DOCUMENTS

| | | | | |
|---|---|---|---|---|
| 8,281,160 B1* | 10/2012 | Bai | ...................... | G06F 1/3228 713/300 |
| 8,621,253 B1* | 12/2013 | Brown | .................... | G06F 1/324 348/500 |
| 8,732,488 B1* | 5/2014 | Gu | ......................... | G06F 1/3228 713/300 |
| 2006/0123252 A1* | 6/2006 | Vaidya | .................. | G06F 1/3228 713/300 |
| 2006/0123253 A1* | 6/2006 | Morgan | ............... | G06F 1/3228 713/300 |
| 2012/0262463 A1* | 10/2012 | Bakalash | ......... | H04N 21/42653 345/501 |
| 2016/0247484 A1* | 8/2016 | Chen | ...................... | G09G 5/399 |

\* cited by examiner

*Primary Examiner* — Ryan M Gray
(74) *Attorney, Agent, or Firm* — Neugeboren O'Dowd PC

(57) ABSTRACT

Systems, methods, and apparatus are herein described for reducing stuttering or skipped frames in media rendering by switching between two sampling windows of a CPU frequency governor. In particular, a sampling window for the governor can switch between a first mode and a second mode, where the first mode involves a default sampling window having a period greater than 1/f, is out of phase with or not aligned with VSync pulses, and is clocked to an internal clock of the CPU frequency governor. The second mode involves an adjusted sampling window having a period equal to 1/f, and is in phase with or aligned with VSync pulses. Further, f, can be the refresh rate of a display device. VSync pulses can be provided to the CPU frequency governor, which can use these pulses to clock the sampling window when a CPU workload becomes or is expected to become sporadic.

19 Claims, 9 Drawing Sheets

VSYNC ALIGNED CPU FREQUENCY GOVERNOR SAMPLING

CROSS REFERENCE TO RELATED APPLICATIONS

The present Application for Patent claims priority to Provisional Application No. 62/161,656 entitled "VERTICAL SYNCHRONIZATION ALIGNED FREQUENCY GOVERNOR" filed May 14, 2015, and assigned to the assignee hereof and hereby expressly incorporated by reference herein.

BACKGROUND

Field of the Disclosure

The present disclosed embodiments relate generally to computing devices, and more specifically to frequency control of multi-core processors of computing devices.

Description of Related Art

Computing devices including devices such as smartphones, tablet computers, gaming devices, and laptop computers are now ubiquitous. These computing devices are now capable of running a variety of applications (also referred to as "apps") and many of these devices include multiple processors to process tasks that are associated with apps. In many instances, multiple processors are integrated as a collection of processor cores within a single functional subsystem. It is known that the processing load on a mobile device may be apportioned to the multiple cores. Some sophisticated devices, for example, have multiple core processors that may be operated asynchronously at different frequencies. On these types of devices, the amount of work that is performed on each processor may be monitored by a central processing unit (CPU) governor to control a clock driver, and hence a clock speed, of the CPU to meet the workload needs.

A user's experience on a computing device is generally dictated by how smooth the user interface ("UI") animation runs on the device. User interface (UI) animations (e.g., browser scroll, email scroll, home launcher scrolls etc.), and the visually attractive animations that are displayed in connection with application launches present an important use-case of periodic workload on the CPU that is also sporadic in nature. Usually a performance benchmark places fixed-sized and sustained workload on the CPU, which allows the CPU governor to latch on to the right clock frequency when running the benchmark. If a particular processing core has a heavy load, the governor can increase the frequency of that processing core. If a processing core has a relatively low load or is idle, the governor can decrease the frequency of that core (e.g., to reduce power consumption).

The Linux operating system for example, can use one of numerous governors, including the "ondemand" and "interactive" frequency governors, to name two non-limiting examples. Both of these governors monitor the workload on a given processor and adjust the corresponding clock frequency based on the workload. Their performance depends on their ability to quickly react to changes in the workload. Frequency governors today have a predefined sampling window (e.g., 20 ms typically) to sample the workload, and based on that workload, scale the CPU frequency. For steady-state CPU workloads, this fixed sampling window is adequate. But if the workload becomes sporadic (e.g., UI scrolling causes a sporadic workload), then this periodic sampling window can fail to react quickly enough to sudden spikes in the CPU workload.

SUMMARY

One aspect of the disclosure can be described as a graphics processing system for reducing stuttering or skipped frames in rendering by switching between two sampling windows of a CPU frequency governor. The system can include a graphics processing circuit, display hardware, a pulse generation circuit of the display hardware, and a CPU circuit. The display hardware can operate at a refresh rate of f. The pulse generation circuit of the display hardware can be configured to generate pulses. The CPU circuit can include a CPU frequency governor in electrical communication with the pulse generation circuit and can include a clock circuit, a pulse input, and a sampling window selection submodule. The pulse input can be in electrical communication with the pulse generation circuit. The sampling window selection submodule can be configured to select a sampling window for the CPU frequency governor, the sampling window based on a signal from either the clock circuit or the pulse input, the sampling window based on the signal from the pulse input when a workload of the CPU is sporadic.

Another aspect of the disclosure can be described as a method for reducing stuttering or skipped frames in rendering by switching between two sampling windows of a CPU frequency governor. The method can include receiving VSync pulses at a CPU frequency governor, the VSync pulses generated by display hardware in communication with the CPU frequency governor. It may also include processing an animation frame in the CPU to generate a first set of rendering commands It yet further can include processing the first set of rendering commands in a graphics processing unit (GPU) to generate a first set of rendered frames, and displaying the first set of rendered frames on a display device via the display hardware. Also, the method can include sampling a CPU workload according to a sampling window and adjusting a frequency of the CPU according to a workload on the CPU ascertained via the sampling. Additionally, the method can include determining that a workload on the CPU has become sporadic, and: decreasing a period of the sampling window from a period of an internal clock of the CPU frequency governor to a period of the VSync pulses, where the period of the VSync pulses is 1/f, and where f is a refresh rate of the display device; and adjusting the sampling window start time to coincide with the VSync pulses.

Yet another aspect of the disclosure can be described as a non-transitory, tangible computer readable storage medium, encoded with processor readable instructions to perform a method for reducing stuttering or skipped frames in rendering by switching between two sampling windows of a CPU frequency governor. The method can include receiving VSync pulses at a pulse input of a CPU frequency governor of a CPU, the VSync pulses received from display hardware. It can also include periodically sampling a CPU workload of the CPU according to a first mode of a sampling window, wherein the sampling window is synchronized with a clock signal from a clock generator of the CPU frequency governor. The method can further include monitoring the CPU workload for a change to a sporadic workload, and switching to a second mode of the sampling window when the CPU frequency generator determines that the CPU workload has become sporadic. The method can yet further include periodically sampling the CPU workload according to the second mode, wherein the sampling window is synchronized with the VSync pulses from the pulse input of the CPU frequency governor.

Further, another aspect of the disclosure can be described as a system for reducing stuttering or skipped frames in rendering by switching between two sampling windows of a CPU frequency governor. The system can include means for receiving VSync pulses at a pulse input of a CPU frequency governor of a CPU, the VSync pulses received from display hardware. It can also include means for periodically sampling a CPU workload of the CPU according to a first mode of a sampling window, wherein the sampling window is synchronized with a clock signal from a clock generator of the CPU frequency governor. The system can also include means for monitoring the CPU workload for a change to a sporadic workload, and means for switching to a second mode of the sampling window when the CPU frequency generator determines that the CPU workload has become sporadic. The system can yet further include means for periodically sampling the CPU workload according to the second mode, wherein the sampling window is synchronized with the VSync pulses from the pulse input of the CPU frequency governor.

DETAILED DESCRIPTION

The word "exemplary" is used herein to mean "serving as an example, instance, or illustration." Any embodiment described herein as "exemplary" is not necessarily to be construed as preferred or advantageous over other embodiments.

For the purposes of this disclosure, "jank" is used herein to mean an animation stutter that a user sees on a display. In other words, when a frame is repeated by display hardware rather than displaying a next frame, this is called a "jank." Others may refer to this as a "VSync miss."

For the purposes of this disclosure a composition engine or composition hardware is an analogue or digital circuit that programs display hardware or an MDP to display buffered image or animation data to a display. The composition engine or hardware includes an input for the buffered data and an output for the data and/or instructions to the display hardware or MDP. The composition engine or hardware engine resides in hardware or can be implemented in software running on the CPU.

For the purposes of this disclosure a SurfaceFlinger module is a software equivalent of the composition engine or hardware running at the user-space level in the CPU in the ANDROID operating system. The SurfaceFlinger module can reside at a kernel level of a CPU.

In some instances, composition functionality and programming of the display hardware or MDP can be distributed between two or more of hardware, software, and firmware.

For the purposes of this disclosure "VSYNC" is a pulse within a computing system that synchronizes certain events to the refresh cycle of the display. Applications start drawing on a VSYNC boundary, and composition hardware or software (e.g., SurfaceFlinger module as used by the ANDROID Operating system) can start compositing on VSYNC boundaries. This allows for smooth application rendering (time based animation) synchronized by the periodicity of the VSYNC pulse.

The inventors recognized that the CPU governor was having trouble keeping up with sporadic changes in the workload, in part because the start of CPU processing on the workload (clocked to VSync pulses generated by display hardware or a mobile display processor (MDP)) and the sampling window generally do not align. In other words, the workload typically changes and then some delay follows before the CPU frequency governor recognizes the change. This introduces unnecessary CPU frequency scaling latency, causing undesirable effects/stutters (e.g., janks) on the user interface (UI).

Figure 1:
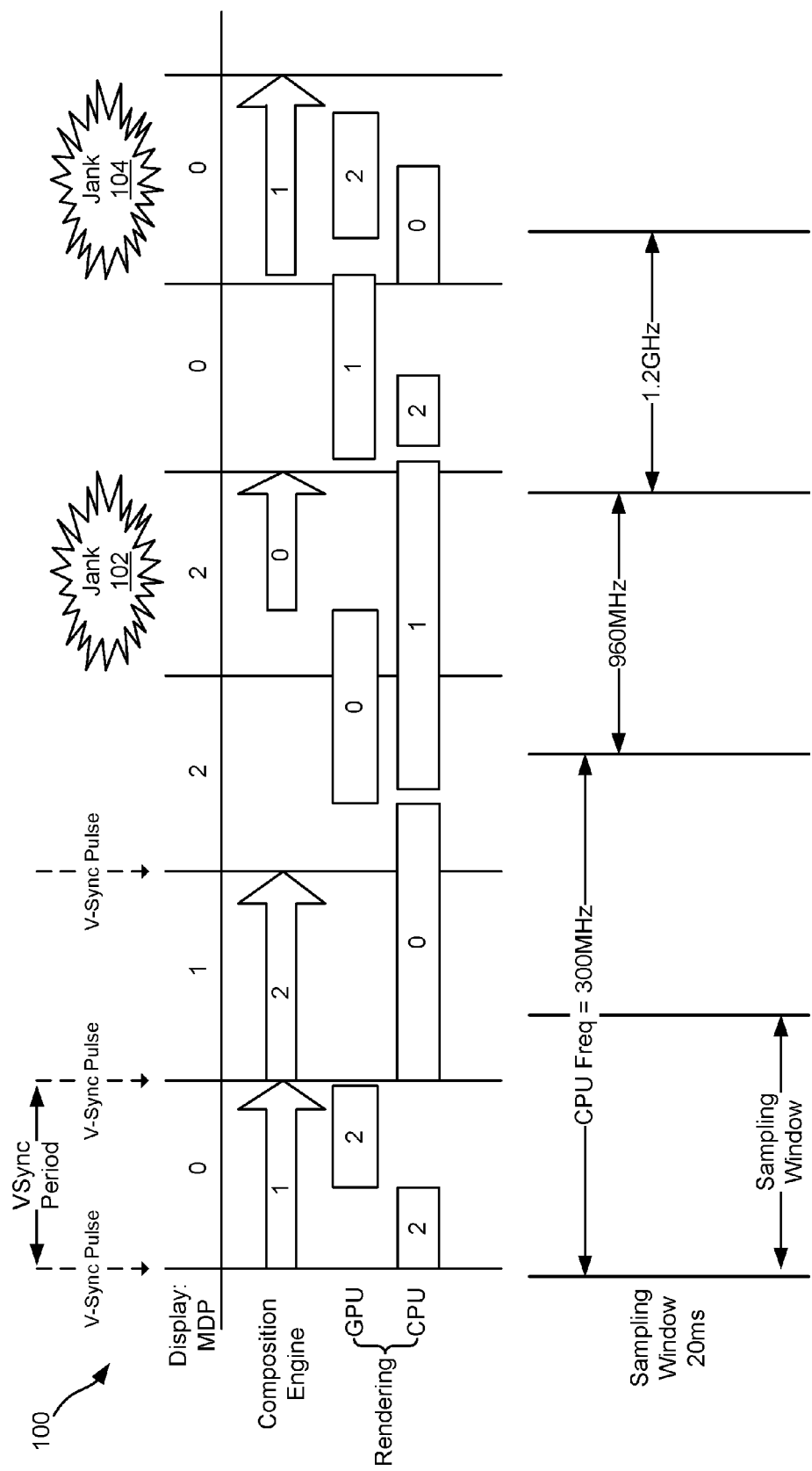
FIG. 1 is a timing diagram showing active periods for a CPU, GPU, Composition module, and mobile display processing (MDP) operating on three different buffers.

FIG. 1 helps to illustrate this challenge and the cause of the problem as recognized by the inventors. This timing diagram shows active periods for a CPU, display hardware (or GPU), composition engine (composition hardware/software module), and display hardware or a display driver (or MDP) operating on three different buffers (buffers 1, 2, and 3). VSync pulses are indicated by vertical lines in the top half of the figure, and the CPU frequency governor sampling windows are shown in the lower half. One can see that the sampling windows have a fixed periodicity (e.g., 20 ms) that is typically great than a period of the VSync pulses (e.g., 16.66 ms), and also out of phase or misaligned with the VSync pulses. At the start of each sampling window, a frequency governor can analyze the CPU load and determine if the CPU frequency should be increased or decreased. Here, the CPU frequency governor determines that the CPU load does not require a CPU frequency increase after the first sampling window, so the CPU frequency remains at a first frequency (e.g., 300 MHz) for the second sampling window. However, after the second sampling window, the frequency governor realizes that the CPU load (e.g., the load for processing buffer 0) is large enough to justify a CPU frequency increase. Most frequency governors, increase CPU frequency in steps, (configurable on a given embedded platform), so it may take at least two sampling windows to upscale from a first frequency (e.g., 300 MHz) to a higher frequency step (e.g., 1.2 GHz). Here, the frequency governor increases the first CPU frequency to a second CPU frequency (e.g., 960 Mhz) partway into the third sampling window. The frequency governor then determines that this second CPU frequency is also not sufficient to handle the load on the CPU, so it again increases the CPU frequency, this time to a third CPU frequency (e.g., 1.2 GHz). However, buffer 1 was processed primarily at the second CPU frequency, which was not sufficient to avoid the processing of buffer 1 from extending into the fifth VSync period, and hence causing the second jank 104. In particular, the second jank 104 is caused by the combined CPU, GPU, and composition engine processing of buffer 1 extending past the sixth VSync pulse, which causes the data from Buffer 0 to be displayed twice (i.e., a jank occurs).

Figure 2:
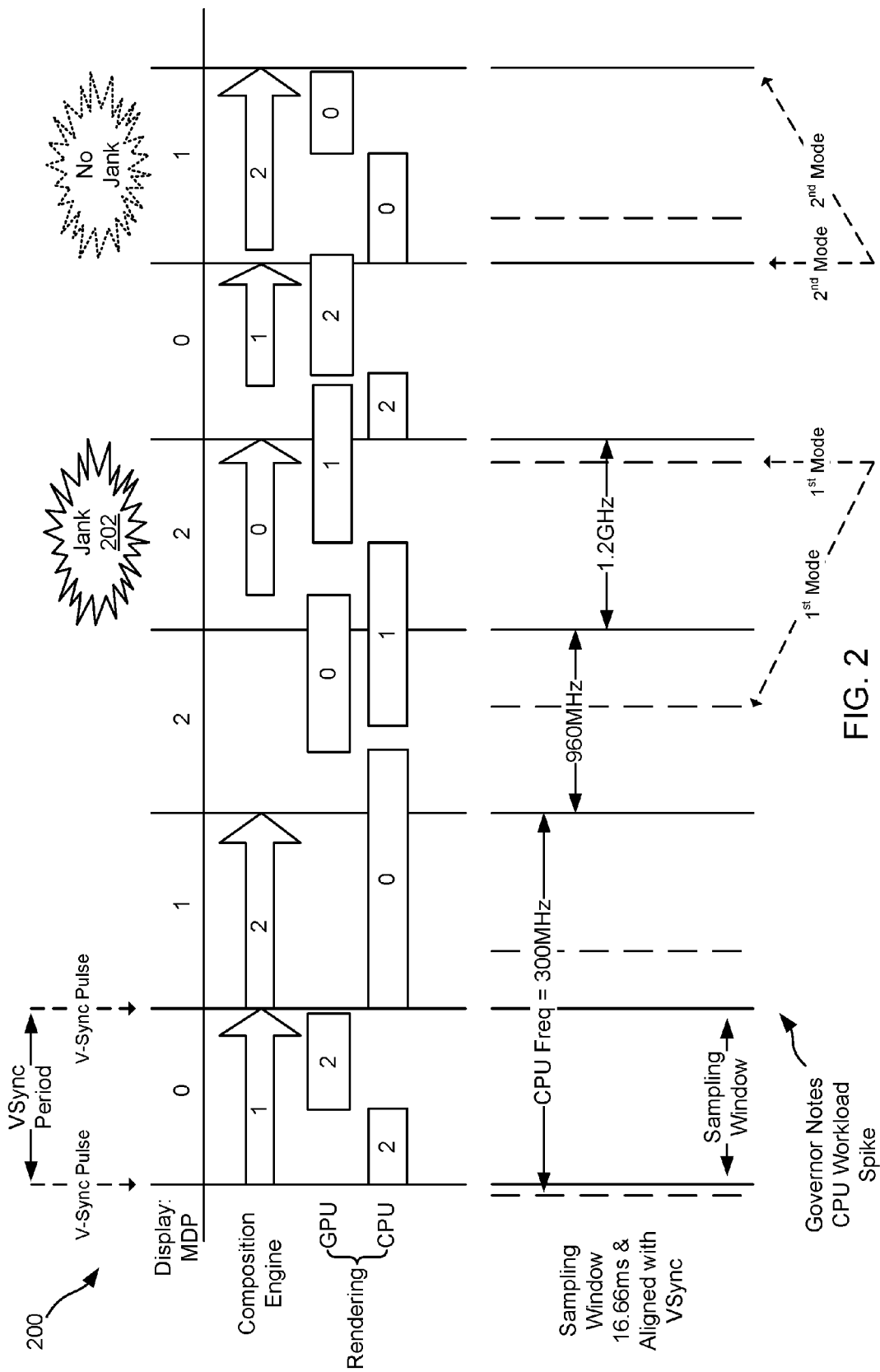
FIG. 2 is a timing diagram where the sampling window is aligned with VSync pulses and the sampling window period is matched to the VSync period, or 1/f.
Figure 7:
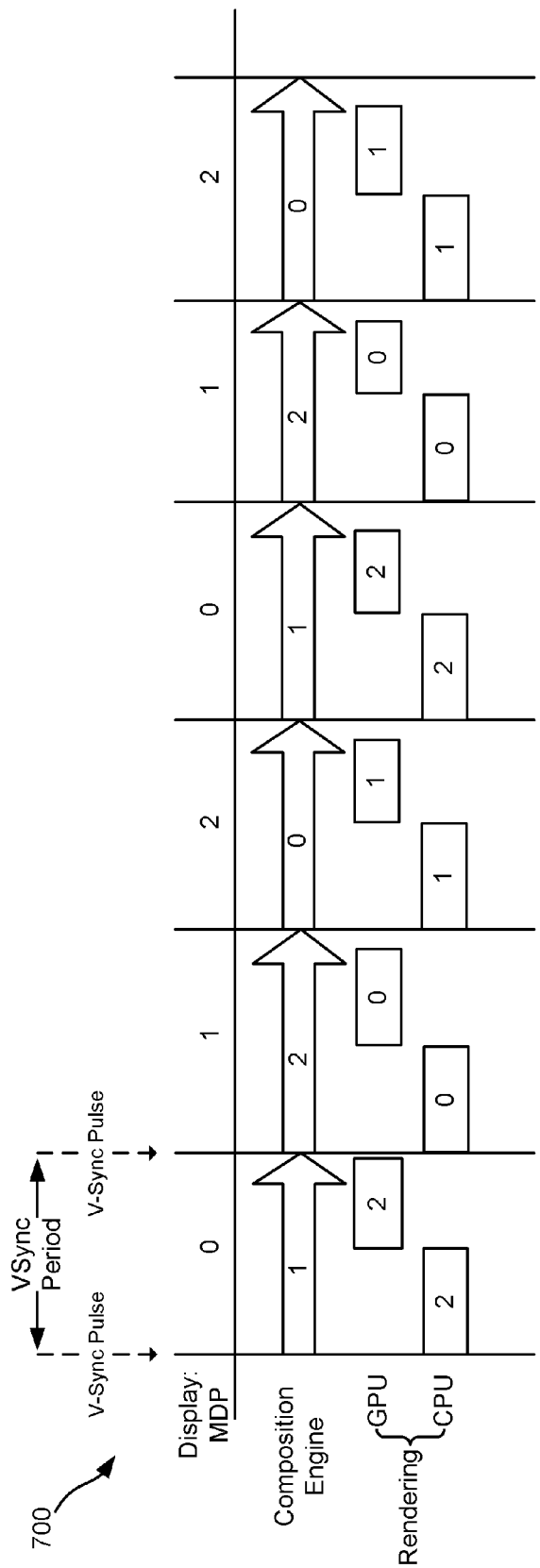
FIG. 7 shows an ideal use case where the CPU workload does not change much for each frame.

Although FIGS. 1, 2 and 7 show processing of three buffers, these herein discloses systems, methods, and apparatus can be implemented with systems having any number of buffers.

The composition engine/module can operate as part of the ANDROID operating system. The arrows in FIGS. 1, 2, and 7 represent which buffer-ID can be composed in the $n^{th}$ VSync cycle.

No one has previously observed these facts and therefore has not recognized that reducing janks can be assisted by providing the VSync pulses to the CPU frequency governor and thereby aligning the CPU frequency governor sampling window period to the start of CPU processing, as well as shortening the CPU frequency governor sampling window to match the VSync cycles (see FIG. 2). In other words, some janks (e.g., jank 104) can be avoided by aligning a start of the sampling windows with the VSync pulses and shortening the sampling window period to match the period of the VSync pulses. One key to this is providing VSync pulses to the CPU frequency governor, whereas the VSync pulses are only currently provided to a portion of the CPU configured for rendering applications. The VSync period is 1/f (where f is the frames per second or the display refresh rate of the display-panel/display-hardware). The value 1/f can often be measured in units of milliseconds, although this is not required. This disclosure suggests a CPU frequency governor having a pulse input, and using the VSync pulse from the display hardware to select a sampling window having a period of 1/f and selecting the sampling window to start at VSync boundaries. The alignment of the sampling window with the VSync pulse is preferred since this provides the most accurate representation of the CPU workload, because the UI workload also starts at VSYNC on an operating system like ANDROID. In particular, since the CPU side of the user interface rendering begins at each VSync pulse, as shown in FIG. 7, starting the CPU workload only at VSync pulses (see FIG. 2) gives a smooth animation without janks (with periodic updates to the CPU governor frequency at a period of 1/f period (i.e., 16.66 ms for a 50 fps panel)). FIG. 7 shows an ideal use case where the CPU workload does not change much for each frame (i.e., is non-sporadic); however for real world applications the CPU workload can be quite sporadic as shown in FIGS. 1 and 2. The sporadic nature of real world CPU workloads is not a good fit for traditional and known CPU frequency governor sampling windows.

While this solution seems simple to those who do not practice in this field, those of skill in the art recognize that no one has attempted to solve this problem in the art in part because few have seen this janking (e.g., 104) as problematic enough to address. Thus, few if any have searched for a solution to this problem. Those that have looked at this problem have been confounded by the problem of addressing sporadic changes in CPU workload using a periodic sampling window. Counterintuitively, the inventors realized that the periodic sampling window could still be used to address this non-periodic or sporadic problem as long as the sampling window is aligned with a start of the sporadic workload (i.e. aligned with the VSync boundaries and having a periodicity 1/f).

FIG. 2 illustrates a timing diagram where the sampling window can be adjusted to align with VSync pulses and the sampling window period can be matched to the VSync period, or 1/f. The vertical lines on the lower half of the figure show the sampling window in two modes. In a first mode or default mode (dotted lines) the sampling window is clocked to an internal clock of the CPU frequency governor (e.g., internal clock circuit 608 in FIG. 6), and has a period longer than 1/f. This can also be referred to as a default sampling window. Further, since the CPU frequency governor clock is not in communication with or otherwise synced to VSync pulses generated by the display hardware, the sampling window in the first mode or default mode is not aligned with, or out of phase with the VSync pulses. This first mode is suitable for periodic loads. However, when a sporadic load is seen or expected by an application processing touch events, the application can make an explicit system application program interface (API) call to the CPU frequency governor to switch to a second mode (solid lines) for a period of time, where the sampling window is clocked to VSync pulses or boundaries (e.g., aligned with or starts at VSync pulses or boundaries), and therefore has a period, 1/f, equal to the period of the VSync pulses. In other words, the second sampling window can be aligned with VSync pulses, boundaries, or cycles. This allows for the most accurate sampling of the sporadic workload (UI rendering) which also starts at the VSYNC pulse on an Operating System like ANDROID.

Comparing FIGS. 1 and 2 one recalls that the second jank (jank 104) in FIG. 1 is caused by the CPU starting to see a sharp rise in workload with buffers 0 and 1, and then the CPU frequency governor failing to react quickly enough to this rise in workload. In particular, the workload spikes with buffer 0, but it isn't until partway through processing of buffer 1 that the CPU frequency governor first recognizes the rise and increases the CPU frequency to a second frequency (e.g., 960 MHz). The stepwise increase in CPU frequency continues at the end of the next sampling window with an increase to a third CPU frequency (e.g., 1.2 GHz), and finally the time that it takes to process a buffer, buffer 2 in this case, drastically reduces. However, because of the delay in reaching this third CPU frequency, the CPU does not finish processing buffer 1 until a whole VSync period has elapsed. This leads to a repeated frame or jank 104. This is because the GPU cannot begin processing buffer 1 until the fifth VSync period, meaning the SurfaceFlinger module cannot process buffer 1 until the sixth VSync period. Accordingly, buffer 1 is not ready for display via the MDP at the start of the sixth VSync period and the display has to repeat buffer 0, which is experienced by the user as a skip or jank 104.

The herein described systems, methods, and apparatus avoid jank 104 by more quickly and more timely reacting to a sporadic CPU workload than systems available in the prior art (e.g., using only the first mode). Part of this solution involves structures that facilitate CPU completion of its workload in under 1/f regardless of the randomness of a sporadic workload.

Despite the disadvantages of this first or default mode, the present disclosure optionally uses this first mode where the CPU load is periodic (hence the dotted sampling window lines in FIG. 2). In this first mode of the sampling window, the CPU frequency governor sampling window is clocked by an internal clock of the CPU frequency governor. This results in the sampling window period being greater than 1/f, for instance 20 ms, and being out of alignment with, or out of phase with, the VSync pulses.

However, for sporadic CPU loads, the disclosure can switch to a second mode, illustrated in FIG. 2 with solid lines (also referred to as an adjusted sampling window). Switching to the VSYNC aligned sampling (i.e., 16.66 ms for 60 Hz display panel) allows the system to meet the sporadic performance requirements for a UI workload. This strategy allows the system to keep the best performance and power balance on an embedded system like a smartphone (running an Operating System like ANDROID) for both sporadic and periodic workload respectively. While the sampling windows in FIG. 2 show both the first and second modes, the processing timeline shows only the results of operating in the second mode. Here, the sampling window has been aligned with VSync pulses or boundaries, meaning that the period of the sampling window has been decreased to 1/f. In the illustrated embodiment, f=60 Hz.

As a result, the CPU frequency governor notes the CPU workload spike much earlier, and in particular when the CPU first begins to process buffer 0 at the second VSync pulse in FIG. 2. Because of this early recognition of the workload spike, the CPU frequency is raised from a first to a second CPU frequency (e.g., from 300 Mhz to 960 MHz) for processing of the tail end of buffer 0 and for the start of processing of buffer 1. At the end of the next sampling window, the CPU frequency governor recognizes that a further CPU frequency increase is needed. The frequency is increased to a third CPU frequency (e.g., 1.2 GHz), and thus buffer 1 is partially processed at the second CPU frequency and partially at the third CPU frequency. This allows the CPU to process buffers 0 and 1 faster than was possible with the first mode of the sampling window (compare to FIG. 1). This allows the GPU to process buffer 1 within the fifth VSync period, allowing the SurfaceFlinger module to process buffer 1 in the fifth VSync period itself, and thereby allowing buffer 1 to be displayed by the MDP in the sixth VSync period. The result is that buffers 2, 0, then 1 are displayed in the fourth through sixth VSync periods without any repeating of a displayed buffer (i.e., the second jank 104 is eliminated).

A switch from the first to the second mode can be triggered by any indication that the CPU workload has become sporadic. In one embodiment, this is indicated by, and the second mode can be triggered by, one or more "touch" events on a touchscreen display device (e.g., the display of a smartphone or tablet computer to name two non-limiting examples). Touch events can include any physical interactions with the display of a touchscreen display device. Recognition of touch events on a touchscreen display is well known to those of skill in the art, and signals generated by such events can be used to initiate or trigger the second mode. In some embodiments, all touch events trigger the second mode. In other embodiments, only certain touch events trigger the second mode. As an example, scrolling, zooming, or app-opening touch events may trigger the second mode, while events associated with more periodic loads, such as selection of a video clip to start watching a video, may not trigger the second mode (i.e., the sampling window continues to operate per the first mode). Despite these examples, various other indications of the CPU workload becoming sporadic can also be implemented.

In an embodiment, an application receives one or more touch events from a display device and determines that the CPU workload has become, or is expected to become, sporadic. The application then makes a system API call to the CPU frequency governor to switch to the second mode.

The second mode can be maintained for a set period of time after the trigger because the sporadic workloads typically are short lived. In an embodiment, the second mode can be maintained for 3 s. In another embodiment, the second mode can be maintained for a period set by a user (e.g., a developer). In another embodiment, the second mode can be maintained for a period that is a function of the type or quality of the trigger. For instance, a 'touch' event on a touchscreen display may result in a first period while two sequential and rapid 'touch' events on the touchscreen display result in a second period longer than the first period. In another example, a 'touch' selection event, where an icon on the user interface is touched in order to open or activate a device app or feature, may result in a first period while a 'touch' scrolling event, where a finger has moved across the user interface indicating a desire to scroll the display, may result in a second period longer than the first period. These are just two non-limiting examples meant to show how different triggers can be associated with different periods of maintaining the second mode. Many other variations are also contemplated.

It should be noted that eliminating the first jank 102, which is caused by a different problem than that recognized by the inventors, is not addressed by this disclosure. Thus, this solution only addresses certain janking situations (e.g., jank 104) and because this is only a partial solution to the problem of janking, those of skill in the art have not previously looked for a cause of this particular cause of janks.

Figure 3:
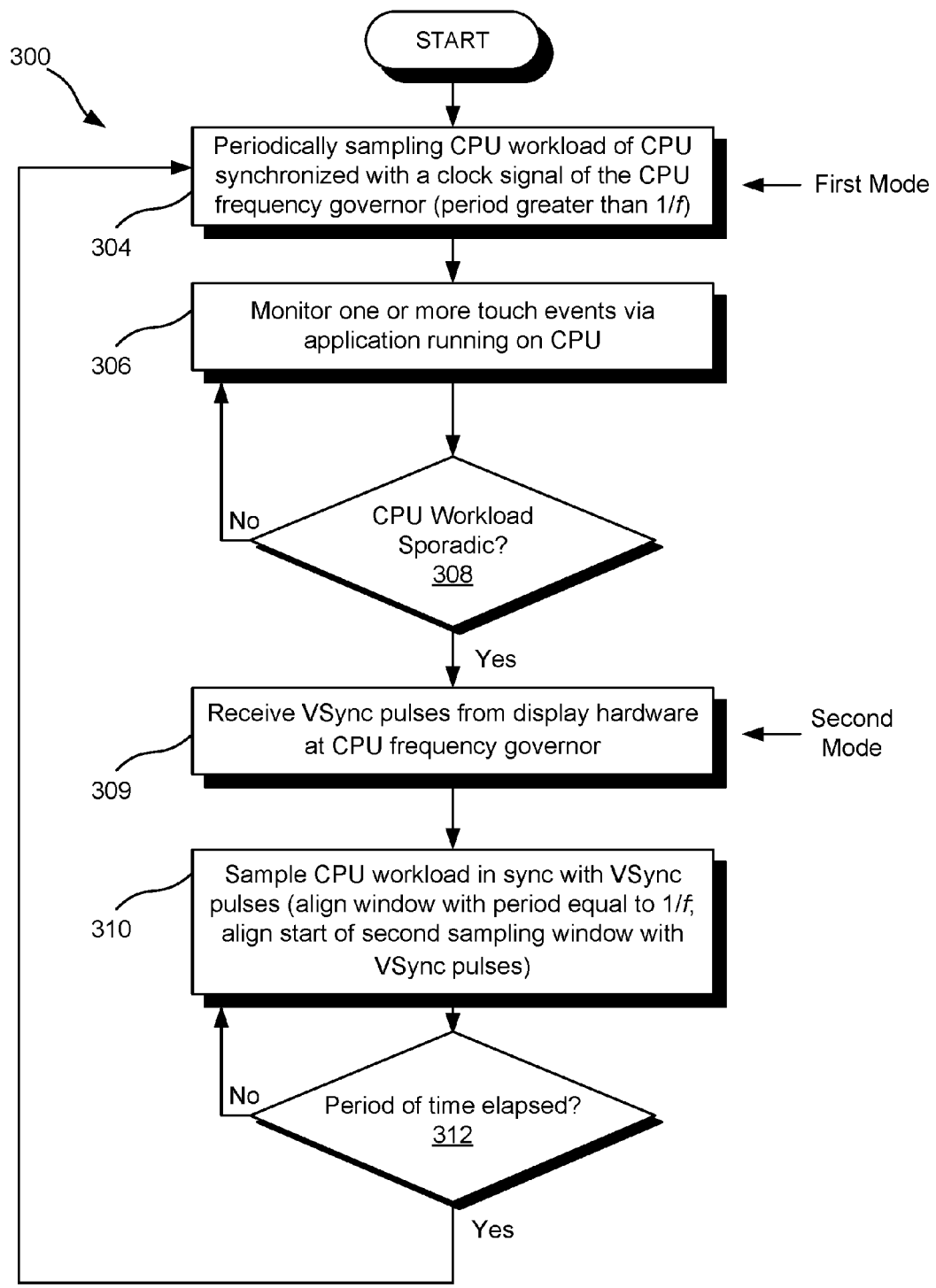
FIG. 3 illustrates a method of carrying out one embodiment for switching between the first and the second mode.

FIG. 3 illustrates a method of carrying out one embodiment for switching between the first and the second mode. The method 300 can include a first mode wherein a frequency governor periodically samples a CPU workload of a CPU based on a CPU frequency governor clock frequency (Block 304). Clock signals of a CPU frequency governor are typically greater than 1/f, and since such a clock is not in communication with or otherwise synchronized with VSync pulses, the clock signals of the CPU frequency governor are not aligned with the VSync pulses or boundaries. This periodic sampling can be deemed a first mode (e.g., dotted lines in FIG. 2) of a CPU frequency governor. Based on this sampling, the CPU frequency governor can adjust the clock frequency of the CPU via instructions passed to a clock driver for the CPU. However, such adjustments are not shown as part of FIG. 3 for the sake of simplicity and to allow FIG. 3 to focus on the changes between the first and second modes.

The method 300 can further include monitoring one or more touch events via an application running on the CPU (Block 306). When the application identifies one or more touch events indicating a sporadic CPU workload (Decision 308), the method 300 can switch to a second mode (e.g., solid lines in FIG. 2) of the periodic sampling, wherein the CPU frequency governor begins receiving VSync pulses (Block 309) and sampling the CPU workload using a sampling window in sync with or aligned with VSync pulses from the display hardware (Block 310). Because of this alignment, a start of this "adjusted sampling window" can have a period equal to (Block 310) and a start of the adjusted sampling window can be aligned with or in phase with the VSync pulses. The second mode (Block 310) can be maintained for a period of time (Decision 312) after which the method 300 can switch back to the first mode of the periodic sampling.

The period of time during which the second mode is maintained (Block 310) can include a fixed or variable period. In some embodiments, the period of time can be a function of the type, quality, or quantity of one or more touch events identified by Decision 308. Decision 308 can be implemented by an application running on a CPU or by a portion of the CPU configured to process touch events from a touchscreen display device.

Relative to the periodic sampling (Block 304), the frequency f is a frequency of VSync pulses from the display hardware. Further, a start of each iteration of the CPU governor sampling window is misaligned or out of phase with the VSync pulses in the first mode. This means that very few if any starts to a sampling window occur simultaneously with a VSync pulse. In most if not all instances, the start of the sampling windows occurs at a different time than the nearest VSync pulse. During the second mode (Block 310), all starts to the sampling window occur at the same time or just after a VSync pulse (i.e., they are aligned with or in phase with the VSync pulses).

Display hardware such as an MDP can generate the VSync pulses. These pulses can be used to trigger or start CPU processing of a given buffer. These VSync pulses can also be routed to a pulse input of the CPU frequency governor (Block 302) and used to select a period and phasing (or alignment) of the sampling window in the second mode (Block 310). The display hardware or MDP can include an internal clock or pulse generator that generates the VSync pulses. The CPU can be modified such that a link or electrical path between the clock or pulse generator of the display hardware or MDP and the CPU frequency governor exists. An input can also be added to the CPU frequency governor to accept or receive the VSync pulses.

The first mode (Block 304) can make use of clock signals from an internal clock of the CPU frequency governor. This clock signal can be used to determine a start and period of a sampling window of the CPU frequency governor. The CPU frequency governor can include a link (e.g., CPU 522 workload input 616 in FIG. 6) or otherwise be in communication with the CPU (e.g., one or more cores of the CPU), and receive data indicating a workload on the CPU. The clock signal can be used to select the sampling window used to analyze the data indicating the workload from the CPU. For instance, the clock or clock circuit (e.g., 608 in FIG. 6) can generate a clock signal that is passed to a sampling window selection submodule (e.g., 604 in FIG. 6). The sampling window selection submodule 604 can select the sampling window including a period and phasing or start time of the sampling window. These parameters can be passed to a sampling submodule (e.g., 606 in FIG. 6), and the sampling submodule can include an input for the CPU workload from the CPU. The sampling submodule can then analyze the CPU workload and determine if the CPU frequency should be adjusted up or down. If an adjustment is in order, then the sampling submodule can pass this information to a CPU frequency control submodule (e.g., 602 in FIG. 6). The CPU frequency control submodule can then take this information and generate a control signal indicating whether the CPU frequency should be scaled up or down. The CPU frequency control submodule can include an output for the control signal and the CPU frequency governor can include an output for this control signal (e.g., CPU frequency output 614 in FIG. 6) that is coupled to a CPU clock driver (e.g., 822 in FIG. 8).

In an embodiment, an application running on the CPU can determine that the CPU workload has become or is expected to become sporadic (Decision 308). For instance, the application can receive one or more touch events from the touchscreen device and determine that the CPU has become or is expected to become sporadic. If the application determines that the workload has become sporadic (Decision 308), and regardless of whether the evidence is a touch event or other indicator, then the application makes a system API call to the CPU frequency governor (e.g., system API call in FIG. 6) which causes the CPU frequency governor to begin receiving VSync pulses from the display hardware. Thus, in an embodiment, the decision 308 is carried out by an application running on the CPU. In an embodiment, decision 308 can include determining if any touch event occurs or determining if specific touch events or specific combinations of touch events occur.

If the workload is deemed to be sporadic by Decision 308, then the method 300 allows VSync pulses to reach the CPU frequency governor, or allows the CPU frequency governor to receive VSync pulses, or allows the CPU frequency governor sampling window to be clocked according to VSync pulses. In other words, the CPU frequency governor begins sampling the CPU workload according to the second mode, or a sampling window that is in sync with, or clocked to, the VSync pulses (Block 310). This may include switching a control or clock of the sampling windows from the internal clock of the CPU frequency generator to the VSync pulses as provided through the pulse input, and then selecting the sampling window based on the VSync pulses rather than the internal clock signals. For instance, a mode selection submodule (e.g., 610 in FIG. 6) can select whether the internal clock (e.g., 608 in FIG. 6) or a VSync pulse from the VSync pulse input (e.g., 611 in FIG. 6) controls the sampling window as selected by a sampling window selection submobdule (e.g., 604 in FIG. 6). Where a change from the first to the second mode is in order, the mode selection submodule can switch which signal controls or is allowed into the sampling window selection submodule. In some embodiments, the signal from the clock and the VSync pulses can both go through the mode selection submodule and the mode selection submodule can only allow one of the two signals to pass through to the sampling window selection submodule.

Monitoring of the same or a different clock signal can optionally be used to determine if a period of time has elapsed since the switch from the first to the second mode (Decision 312). Sampling via the second mode can continue until the clock signal reaches a threshold. Once the threshold time is reached, the method 300 can switch modes back to the first mode and begin sampling according to the internal clock again (Block 304). In an embodiment, the threshold can vary based on the application involved in the rendering.

Figure 5:
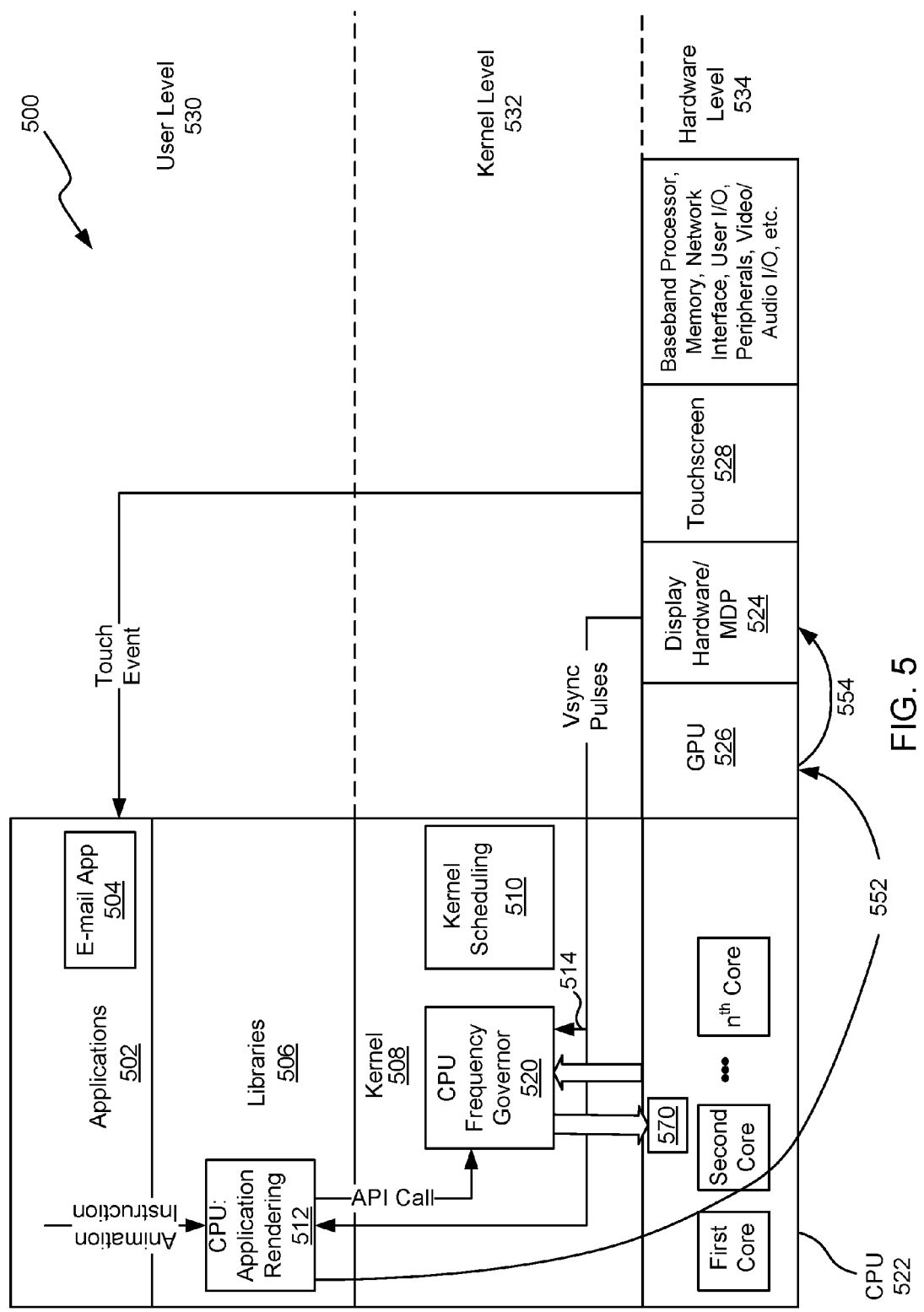
FIG. 5 is one embodiment of a block diagram illustrating components of a computing system configured to implement the methods described in this disclosure.

Monitoring the touchscreen device can include receiving a touch event or other data indicating a touch event, from the touchscreen device (e.g., 528 in FIG. 5). Such receiving can be performed by an application running on the CPU, and can thus be said to be performed by the application or the CPU.

Figure 4:
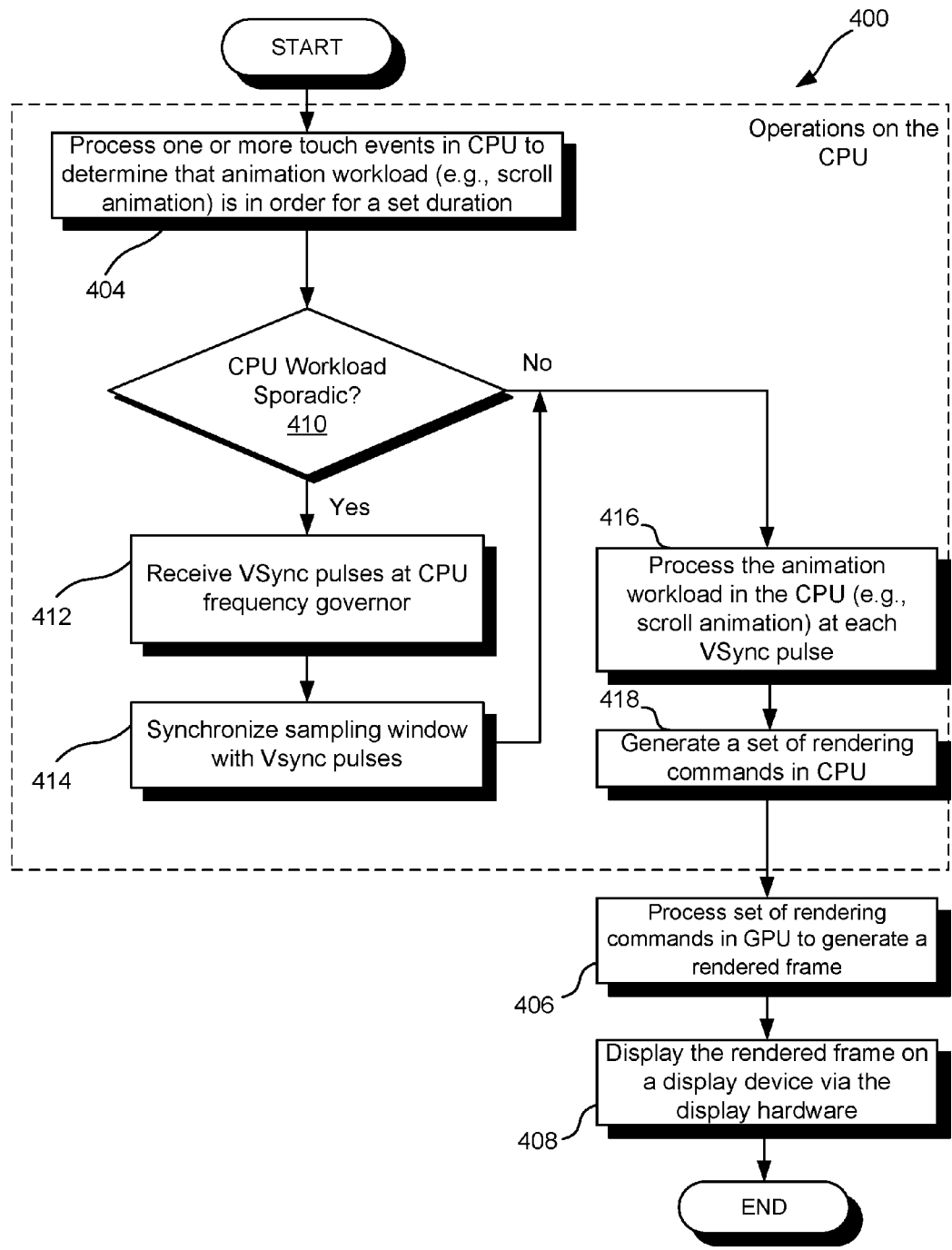
FIG. 4 illustrates a method for reducing stuttering or skipped frames in media rendering by switching between two sampling windows of a CPU frequency governor.

FIG. 4 illustrates a method for reducing stuttering or skipped frames in media rendering by switching between two sampling windows of a CPU frequency governor: the default sampling window (first mode) is synchronized to an internal clock of the CPU frequency governor while the adjusted sampling window (second mode) is synchronized to VSync pulses. The default sampling window can be associated with a first mode of the sampling window or first mode, and the adjusted sampling window can be associated with a second mode of the sampling window or second mode. Typically, sampling windows are based on a clock internal to the CPU frequency governor, and the CPU frequency governor does not have access to VSync pulses, which are typically only used to dictate start times for CPU processing of animation frames. However, in this disclosure the VSync pulses are also provided to the CPU frequency governor via a pulse input of the CPU frequency governor, and these pulses are used to select the period and start times of a second mode of the sampling window.

The method 400 closely aligns with the switch from the first mode to the second mode of the sampling window shown in FIG. 2. In a first mode of the sampling window, VSync pulses are not used by the CPU frequency governor. Instead, an internal clock of the CPU frequency governor is used to select the sampling window that the CPU frequency governor uses to determine if scaling of the CPU frequency is in order.

The method 400 begins by processing one or more touch events in the CPU to determine that a workload associated with an animation is in order (Block 404) and that such a workload is expected for a set duration. When an animation workload is expected, and the application further determines that the animation will lead to a sporadic workload on the CPU (Decision 410), then method 400 can switch to the second mode of the sampling window where the sampling window is synchronized with, or clocked to, VSync pulses received at the CPU frequency governor. This second mode involves receiving VSync pulses at the CPU frequency governor (Block 412), and then synchronizing or clocking the sampling window to the VSync pulses (Block 414). Such synchronization can include decreasing a period of a sampling window of the CPU frequency governor of the computing device to match the period of the VSync pulses. This also happens to be 1/f, where f is a refresh rate of the display device (also equal to the frequency of the VSync pulses) since the VSync pulses control refreshing of the display (Block 414). This synchronization also involves adjusting the sampling window to start at substantially the same time as the VSync pulses.

Once this synchronization is complete, or if the application does not determine that the animation will lead to a sporadic CPU workload (Decision 410), then the CPU can process the animation workload (e.g., a scrolling animation) at each VSync pulse (Block 416). In other words, CPU processing of each frame of the animation can begin at a VSync pulse or boundary. The CPU can then generate a set of rendering commands for the GPU (Block 418). So far, all aspects of the method 400 have been performed on the CPU, as indicated via the dashed outline in FIG. 4. The remaining operations can be performed on the GPU and other rendering hardware.

The GPU can process the set of rendering commands from the CPU to generate a rendered frame (Block 406). The rendered frame can then be displayed on a display device via the display hardware (Block 408) such as an MDP. A series of rendered frames can appear as an animation rendered at f fps (where f Hz is the refresh rate of the display hardware).

Where the CPU frequency governor determines that a different clock frequency is in order, whether the first or second mode of the sampling window is being used, the CPU performs the Blocks 416 and 418 per the clock frequency set by the CPU frequency governor.

In one embodiment, Block 418 can be implemented in OpenGLES. In an embodiment the set of rendering commands can be stored in a command buffer for rendering the animation. This command buffer can include GL, or OpenGL, commands. In an embodiment, the rendered frames can be rendered to an application buffer or a rendered frames buffer.

By starting at substantially the same time as the VSync pulses it is meant that the sampling window can align with or be in phase with the VSync pulses, that the sampling window can start as a result of triggering by the VSync pulses, and/or that the sampling window can start at the same time as the VSync pulses. Because of small delays caused by typical processing and inter-system communication latency, "substantially the same" can include small delays consistent with expected latency of computing systems. Another way to say this is that the sampling window in the second mode (e.g., Blocks 412 and 414) can be synchronized with the VSync pulses (Block 414).

Display hardware such as an MDP can generate the VSync pulses. These pulses can be used to trigger or start CPU processing of a given buffer (e.g., generating rendering commands in response to identifying an animation resulting from one or more touch events) (Block 412). These VSync pulses can also be routed to a pulse input of the CPU frequency governor (Block 412) and used to select a period and phasing (or alignment) of the sampling window in the second mode (Block 414). The display hardware or MDP can include an internal clock or pulse generator that generates the VSync pulses. The CPU can be modified such that a link or electrical path between the clock or pulse generator of the display hardware or MDP and the CPU frequency governor exists. An input can also be added to the CPU frequency governor to accept or receive the VSync pulses.

Each rendered frame can be passed to a display device via a composition engine and display hardware or an MDP (Blocks 406, 408). The composition engine can perform composition on the rendered frames. An opening system like ANDROID allows multiple applications to be rendered and displayed at the same time. It is the job of the composition engine to show them in the right order (z-order/depth) and the right screen. Display hardware such as an MDP can be implemented in a variety of situations.

In an embodiment, decision 410 can include determining if any touch event occurs or determining if specific touch events or specific combinations of touch events occur. The Decision 410 can be implemented in an application running on the CPU. Further, if the CPU workload is deemed sporadic, then the application can make a system API call to the CPU frequency governor to switch to a second mode of the sampling window (i.e., Blocks 412 and 414).

If the workload is deemed to be sporadic by Decision 410, then the method 400 samples the CPU workload according to the second mode, or an adjusted sampling window that is in sync with the VSync pulses (Block 414). This may include switching a control or clock of the sampling windows from the internal clock of the CPU frequency generator to the VSync pulses as provided through the pulse input, and then selecting the sampling window based on the VSync pulses rather than the internal clock signals. For instance, a mode selection module (e.g., 610 in FIG. 6) can select whether the internal clock (e.g., 608 in FIG. 6) or a VSync pulse from the VSync pulse input (e.g., 611 in FIG. 6) controls the sampling window as selected by a sampling window selection submobdule (e.g., 604 in FIG. 6). Where a change from the first to the second mode is in order, the mode selection submodule can switch which signal controls or is allowed into the sampling window selection submodule. In some embodiments, the signal from the clock and the VSync pulses can both go through the mode selection submodule and the mode selection submodule can only allow one of the two signals to pass through to the sampling window selection submodule.

By switching to the second mode of the sampling window (i.e., by switching to synchronization with the VSync pulses), the method 400 can decrease a sampling window of the CPU frequency governor to a period of 1/f, where f is the frequency of the VSync pulses (also the refresh rate of the display) (Block 414). The internal clock of the CPU frequency governor is typically less than f, and therefore switching to control of the sampling window based on the VSync pulses involves a decrease in the period of the sampling window.

At the same time, synchronizing with the VSync pulses also involves a change in a phase of the sampling window since the CPU frequency governor internal clock and the VSync pulses are typically not in phase (Block 414). This change in phase therefore causes or correlates to a start of the sampling window adjusting to align with or start at substantially the same time as the VSync pulses.

FIG. 5 is one embodiment of a block diagram illustrating components of a computing system 500 (also referred to herein as a computing device 500) configured to implement the methods described in this disclosure. The block diagram 500 includes applications 502 (e.g., an e-mail application 504, web browser, etc.) at the highest level of abstraction and hardware such as a CPU 522 (which includes a plurality of processing cores), display hardware or a mobile display processor ("MDP") 524, a graphics processing unit ("GPU") 526 or graphics processing circuit, and a touchscreen device 528 at the lowest level (or hardware level 534). The touchscreen hardware or touchscreen device 528 can be an input device normally layered on top of the display panel. In an embodiment, the touchscreen hardware can generate a touch input or indicator that can be passed to the one or more Applications 502 or the CPU: application rendering 512, while the display is active (i.e. ON). As depicted, libraries 506 in this embodiment include a CPU-side-application-rendering library that is responsible for using the GPU 526 to provide hardware acceleration by using the OpenGLES API (e.g., an open standard Kronos API). In this manner, the CPU 522 can use the GPU 526 to perform hardware accelerated application rendering (which in itself is a performance enhancement required for high resolution devices). The applications 502, libraries 506, and kernel 508 can all be part of the CPU 522.

The CPU frequency governor 520 (also referred to herein as the governor or processor governor) generally operates to monitor a workload on the CPU (or CPU 522 workload), and determine an operating frequency for those of the cores of the CPU 522 that are online/active. Although the specific embodiment depicted in FIG. 5 depicts multiple processor cores within the CPU 522, it should be recognized that other embodiments can include one or more cores that are not integrated within the CPU 522 (i.e., external to the CPU 522). As a consequence, the operation of multiple cores is described herein in the context of both multiple processor cores, and more generally, multiple processors, which may include processor cores and discrete processors.

The CPU frequency governor 520 can include two modes for a sampling window used to determine an optimal CPU operating frequency. The first mode (default), used when the CPU 522 workload is non-sporadic, uses an internal clock signal from the CPU frequency governor 520 to select the sampling window period and phase (e.g., start time for each sample). A clock circuit for providing this internal clock signal can be part of the CPU frequency governor 520. When one of the applications 502 running on the CPU 522 determines that the CPU 522 workload has become sporadic (e.g., by determining that one or more touch events from the touchscreen 528 should result in a scroll animation), the application 502 can make a system API call to the CPU frequency governor 520 to switch to the second mode having the adjusted sampling window. In particular, the application 502 can pass an animation instruction to the portion of the CPU 512 responsible for application rendering. This portion of the CPU 512 can then make a system API call to the CPU frequency governor 520.

The adjusted sampling window can be synchronized to VSync pulses from the display hardware or MDP 524. Typically, the VSync pulses are only provided to the CPU application processing 512, or a portion of the CPU responsible for processing the one or more touch events from the touchscreen device 528 in an operating system like ANDROID. However, this disclosure departs from the prior art by adding an additional link 514, or communication channel, between the display hardware or MDP 524 and the CPU frequency governor 520 (see also the VSync pulse input 611 in FIG. 6 that couples the link 514 to the CPU frequency governor 520). Via this link 514 and the input 611, the CPU frequency governor 520 is able to receive the VSync pulses and synchronize the adjusted sampling window with CPU 522 processing of the one or more touch events. Synchronizing to the VSync pulses means that the adjusted sampling window and CPU 522 processing of the one or more touch events start at the same time, and that the period of the adjusted sampling window is reduced to match the period of CPU 522 processing. In other words, this allows for the most accurate sampling of the workload by the CPU frequency governor 520, since both the animation workload and the sampling window now start at the VSYNC. The CPU sampling window is now synchronized with the VSYNC pulse.

This second mode of the sampling window can be entered whenever one of the applications 502 determines that the CPU 522 workload has become sporadic. In an alternative embodiment, the CPU frequency governor 520 can monitor the CPU 522 workload to determine when to switch from a first to a second mode of the sampling window. In this embodiment, the CPU 522 workload can be received at the CPU frequency governor 520 via a CPU 522 workload input 616 seen in FIG. 6. The workload can then be sampled and analyzed by the CPU frequency governor 520 to determine an optimal CPU 522 frequency (Block 310 in FIG. 3). In an embodiment, one or more touch events can trigger the switch from the default to the adjusted sampling window by way of one of the applications 502 and a system API call to the CPU frequency governor 520. In other words, a finger swipe can generate a series of consecutive touch events, and these touch events can trigger a switch to the adjusted sampling window. The Applications 502, running on the CPU 522, or that portion of the CPU 522 configured for application rendering (e.g., CPU: application rendering 512), can determine that the touch event or series of touch events should trigger an animation such as scrolling of the display, and the applications 502 or portion of the CPU configured for application rendering 512 can send rendering commands to the GPU 526 to render a corresponding animation as well as make a system API call to the CPU frequency governor 520 to switch to the second mode of the sampling window.

In an embodiment, a touch event alone may not be sufficient to trigger the second mode of the sampling window. In some cases a certain type, quality, or quantity of one or more touch events may be needed (e.g., a series consecutive touch events indicating the need for a scroll animation).

Regardless of the sampling window that the CPU frequency governor 520 is using, its output is a CPU frequency or an instruction to a CPU clock driver 570 indicating a desired CPU frequency. The CPU frequency or instruction can be passed from the CPU frequency governor 520 via a CPU frequency output 614 (see FIG. 6). The CPU clock driver 570 can then send a CPU clock signal to the CPU thereby controlling a frequency of the CPU 522 or of a given core of the CPU 522.

The one or more applications 502 may be realized by a variety of applications that operate via, or run on, the CPU 522. For example, the one or more applications 502 may include the e-mail application 504 and associated plug-ins, entertainment applications (e.g., video games, video players), productivity applications (e.g., word processing, spread sheet, publishing applications, video editing, photo editing applications), core applications (e.g., phone, contacts), and augmented reality applications, to name a few non-limiting examples.

In general, the CPU frequency governor 520 operates to adjust the operating frequency of each of the processor cores based upon the workload that each processor core is performing If a particular one of the processor cores has a heavy workload, a CPU frequency control submodule (see 602 in FIG. 6) of the CPU frequency governor 520 may increase a frequency of the particular processing core. If another processing core has a relatively low workload or is idle, the frequency of that processor core may be decreased (e.g., to reduce power consumption). For instance, the CPU frequency governor 520 can sample the CPU 522 workload to determine whether to raise or lower the CPU operating frequency. The CPU 522 workload can enter the CPU frequency governor via a CPU 522 workload input 616. The CPU frequency control submodule 602 (or frequency adjustment component) of CPU frequency governor 520 can then control the operating frequency of the cores. In many embodiments, this frequency control is carried out independently on each processor core, with each processor core scaling independently of the others.

In the embodiment depicted in FIG. 5, the effect of sporadic workloads is mitigated by having the CPU frequency governor 520 switch from the default sampling window to the adjusted sampling window (both sampling windows are shown in FIG. 2). The adjusted sampling window samples the CPU 522 workload at the VSync boundary (or at each VSync pulse). This adjusted sampling window may entail both a change in the alignment or phase of the sampling window as well as a decrease in the period of the sampling window from greater than 1/f to equal to 1/f. This switch can be made possible by the mode selection submodule 610, which can control or select which of two clock pulses controls the sampling window. In the first mode, the mode selection submodule 610 uses a clock signal from an internal clock circuit 608 of the CPU frequency governor 520, and in the second mode, the mode selection submodule 610 uses the VSync pulses from the display hardware or MDP 524. In an embodiment, the mode selection submodule 610 can prevent one or the other of the clock signal from the internal clock circuit 608, or the VSync pulse from the display hardware or MDP 524 from reaching the sampling window selection submodule 604. In an embodiment, the display hardware or MDP 524 can include a pulse generation circuit 612 that generates the VSync pulses.

Figure 6:
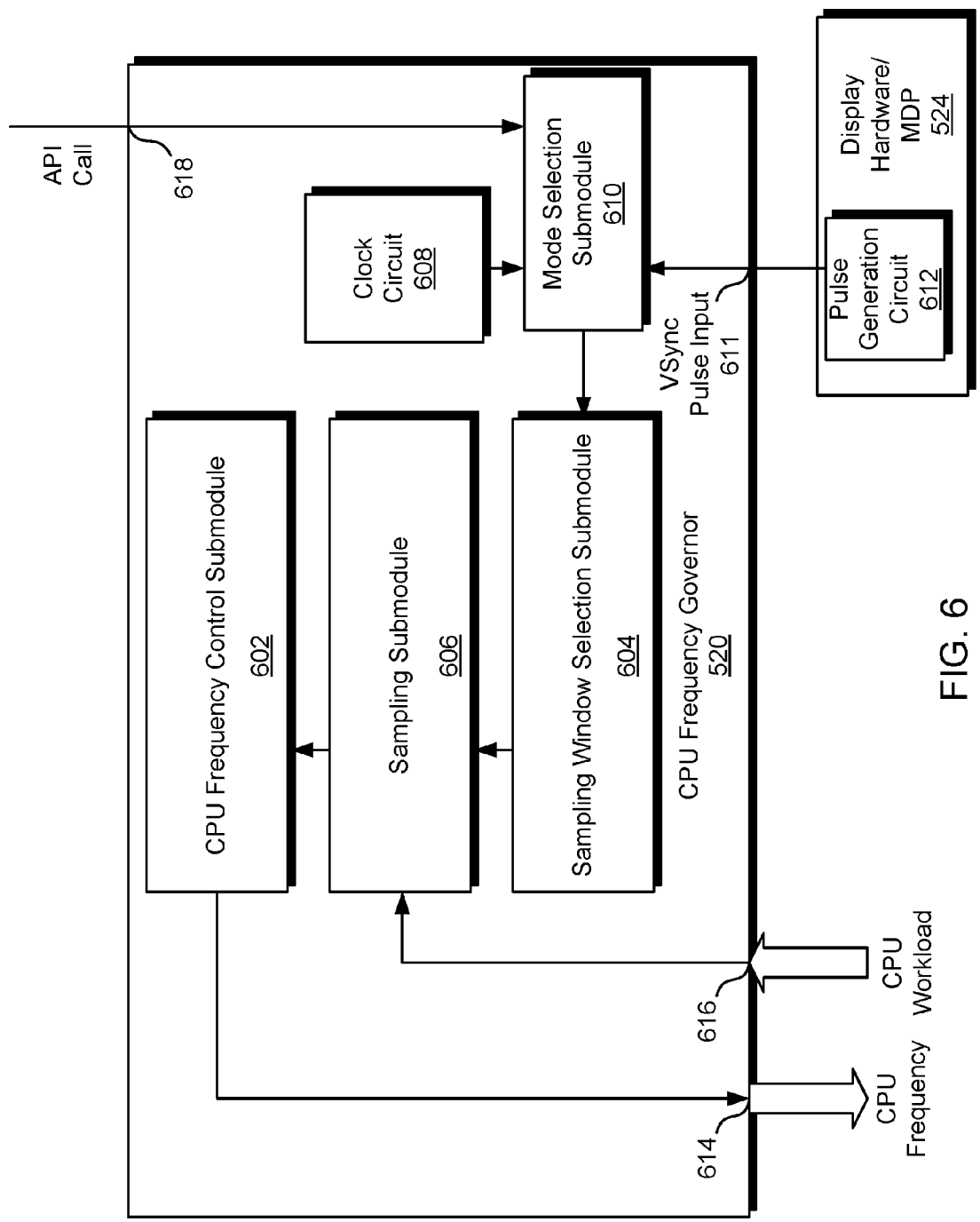
FIG. 6 illustrates a detailed view of a CPU frequency governor according to an embodiment of this disclosure.

As depicted in FIG. 6, a sampling window selection submodule 604 of the CPU frequency governor 520 can be configured to set the CPU governor sampling window to a period of 1/f (for the adjusted sampling window), and this change can take place when the CPU frequency governor 520 deems the CPU 522 workload to have become sporadic. In some embodiments, the mode selection submodule 610 can be responsible for this determination based on a system API call from an application running on the CPU 522. Operation of the sampling window selection submodule 604 can be based on a received clock signal—either from the internal clock circuit 608 or from the VSync pulses received at the VSync pulse input 611.

Also depicted in FIG. 6, is a sampling submodule 606 configured to carry out CPU load sampling according to a sampling window provided by the sampling window selection submodule 604. In the second mode of the sampling window, the period of the sampling window is 1/f, and a start of the sampling window is substantially concurrent with a start of CPU processing of a next frame of the animation, which also happens to coincide with the VSync pulses since VSync pulses control both the sampling window and the CPU processing start time.

Returning to FIG. 5, when the one or more applications 502 receives one or more touch events and determines that an animation is in order (e.g., a scrolling animation in response to a user finger swipe gesture on the touchscreen device 528), and regardless of whether the CPU frequency governor 520 decides to use either the first or second sampling window, the one or more applications 502 can pass an animation instruction to a portion of the CPU configured for processing animations 512. In particular, this portion of the CPU 512 can be configured to process animation frames and thereby generate rendering commands for the GPU 526.

The CPU application processing 512 can generate rendering commands 552 commands for the GPU 526 (e.g. GL commands) The trigger for the CPU's 522 creation of these rendering commands can be a VSync pulse form the display hardware or MDP 524. The result of this processing is a set of rendering commands 552 output from the CPU 522 and buffered so as to be processed by the GPU 526. The GPU 526 can receive the set of rendering commands 552 as an input, or access them from a buffer, process the set of rendering commands 552, and output a rendered frame 554 for each set of rendering commands 552 (i.e., one set of rendering commands 552 is generated for each VSync pulse). The GPU 526 can pass the rendered frames 554 to the display hardware or MDP 524 (or buffer the rendered frames 554 for display by the MDP 524) via the composition engine (not shown in FIG. 5. For simplicity). The display hardware or MDP 524 can process the rendered frames 554 (e.g., accessing the rendered frames 554 from a buffer) at a fixed refresh rate (f Hz) and output the VSYNC pulse to the CPU to further synchronize application rendering and CPU load sampling via link 514.

Benefits of the computing system 500 include aligning the load sampling of the CPU frequency governor 520 at the point where the CPU 522 workload starts, and reducing the typical sampling-window from greater than 1/f (e.g., 20 ms) to 1/f (e.g., 16.66 ms). This makes a scaling response of the CPU frequency governor 520 more deterministic—the response occurs at the VSync boundary rather than at some later arbitrary time. As shown in FIG. 2, this sampling approach (second mode) may result in an ideal user interface timeline achieving reduced stutter or jank free operation where the CPU 522 workload starts at VSync pulses.

The act of sampling a load by the CPU frequency governor 520 can be done by measuring how long a CPU core was idle in the most recent sampling window. For example, if the CPU was idle 25% of the time then the load sampled would be 75% at the current CPU frequency. Given a larger the sampling window, the probability is higher that the CPU core will be idle during the sampling period and hence the average load will appear lower. Inversely a lower sampling window (e.g., 1/f ms) can potentially result in measuring a higher CPU load on average (or less CPU idle) and likewise cause a higher CPU frequency to be selected by the governor. To reduce the power impact of the second mode of the sampling window (too short a sampling window (1/f ms) or too much time spent in the second mode can drastically increase power consumption), the second mode may be triggered upon a determination that the CPU 522 workload has become sporadic (e.g., as a result of one or more touch events, e.g., as a result of receiving a system API call from one of the one or more applications 502). Further, the second mode can be limited to a set duration or period, such as 3 seconds. This period can be configured by a user or developer, and/or can be a variable period based on the type, quality, and/or quantity of one or more touch events. Touch events have been highlighted since they often introduce a sporadic element to the CPU 522 workload. However, other sources of triggering a switch from the first to the second mode of the sampling window can also be implemented.

Among other functions, the kernel scheduling component 510 (also referred to herein as a scheduling component 510) operates to migrate tasks between the cores to balance the load that is being processed by the CPU 522. In connection with the ANDROID platform, the CPU 522 manages the user interface elements (e.g., ANDROID View Hierarchy) and prepares rendering work (e.g., using OpenGLES) for the GPU 526 to finish.

As is known to those of skill in the art, the CPU 522 workload (e.g., user interface workload) may be split between the CPU 522 and the GPU 526 (ANDROID uses the GPU 526 to do the user interface rendering as an optimization). Based on how the applications 502 are designed, both the CPU 522 workload and the GPU 526 workload can vary during the course of an animation sequence. Under ideal conditions, it is desirable for the application running the animation to be double-buffered such that both CPU 522 and the GPU 526 finish their workloads under 1/f ms (f Hz being the display panel refresh rate) in a current VSync cycle (e.g., n) to show the rendered frame in the very next VSync cycle (e.g., n+1) on the display 524. However to be conservative in practice, application animations may be triple-buffered (as used in ANDROID and also shown in FIGS. 1, 2 and 7) to individually allow the average CPU rendering time to be under 1/f ms and the average GPU rendering time to be under 1/f ms.

As one of ordinary skill in the art will appreciate, the user-space 530 and kernel-space 532 components depicted in FIG. 5 may be realized by hardware in connection with processor-executable code stored in a non-transitory tangible processor readable medium such as nonvolatile memory (not illustrated in FIGS. 5-7), and can be executed by the CPU 522. Numerous variations on the embodiments herein disclosed are also possible. For instance, the CPU frequency governor 520 (or CPU frequency governor) can be selected from the following non-exclusive list: interactive, smoothass, conservative, ondemand, userspace, powersave, performance, smartass, and always max. Janking is especially problematic for interactive and ondemand governors. All modules described herein can be stored in a memory and can operate on the CPU 522 or other processor.

Figure 8:
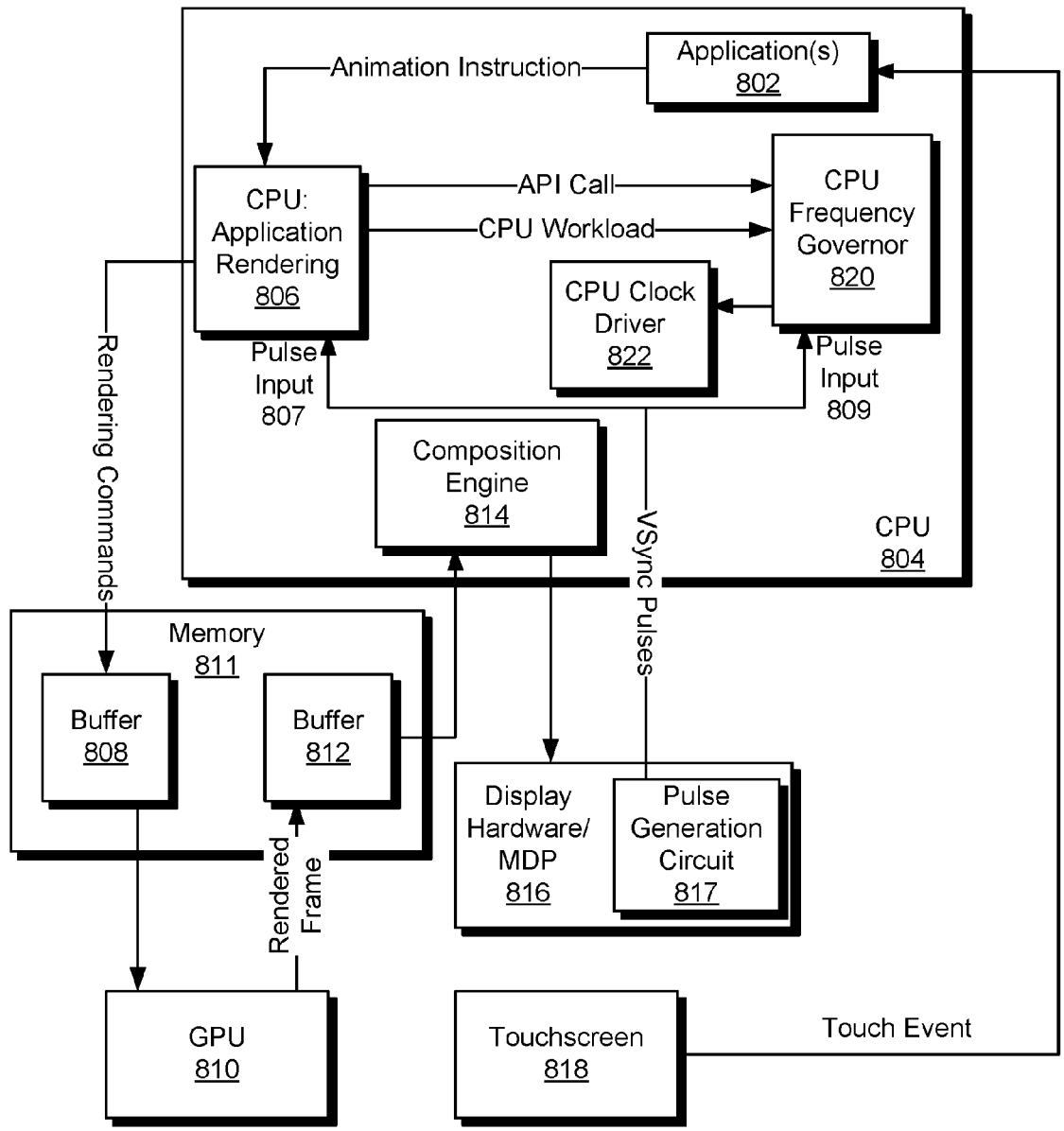
FIG. 8 illustrates another embodiment of a system-on-chip for carrying out CPU frequency regulation based on VSync pulses from the display hardware or MDP.

FIG. 8 illustrates another embodiment of a system-on-chip for carrying out CPU frequency regulation based on VSync pulses from the display hardware or MDP. The touchscreen device 818 can include touch-sensitive circuits, or touchscreen hardware, that generate a touch event or touch signal in response to a user's touch input. The touchscreen device 818 can pass the touch event to one or more applications 802, running on a CPU 804, which may trigger an animation such as scrolling of the user interface (e.g., a series of consecutive or closely-spaced-in-time touch events may trigger a request for a scrolling animation). An animation instruction can be passed to a portion of the CPU 804 (also referred to as the CPU: application rendering 806) configured to generate rendering commands (e.g., GL commands) for a GPU 810. The CPU: application rendering 806 can analyze the animation instruction from one or the applications 802 and make a system API call to the CPU frequency governor 820 that causes the CPU frequency governor 820 to switch to a second mode of a sampling window aligned to the VSYNC pulse (received at the VSYNC pulse input 809). Based on the load sampled, the CPU frequency governor 820 can use the CPU clock driver 822 to scale the CPU frequency (up or down)

The system 800 includes a CPU 804 having one or more applications 802 running thereon. The CPU 804 can be in electrical communication with a graphics processing unit (GPU) 810 and a display hardware or mobile display processor (MDP) 816. The touchscreen device 818 can be in electrical communication with both the CPU 804 and likewise with the one or more applications 802 running on the CPU 804.

The CPU 804 can include a CPU clock driver 822, a CPU frequency governor 820, and a composition engine 814, and a CPU: application rendering 806 for rendering animation frames and generating rendering commands The CPU: application rendering 806 is also configured for determining when the CPU frequency governor should switch between the first and second mode of the sampling window and as a result, making a system API call to the CPU frequency governor 820 to trigger such a switch. The CPU: application rendering 806 for rendering animation frames and generating rendering commands can receive the animation instruction, and can render a first set of rendering commands to a first buffer 808 (e.g., a "command buffer") for rendering the animation. The first buffer 808 can either reside on the CPU 804 or external to the CPU 804. Either way, the GPU 810 renders the first set of rendering commands from the first buffer 808, and generates a first rendered frame that is stored in a second buffer 812 (e.g., an "application rendered buffer"). As illustrated, the first and second buffers 808, 812 are part of a memory 811. In other embodiments, the first and second buffers 808, 812 can be part of separate memory devices. The GPU 810 can then take additional sets of rendering commands and generate a rendered frame for each set. The composition engine 814 can perform composition on the rendered frames from the second buffer 812 and program the display hardware or MDP 816 to display the composited frames. Once the display hardware or MDP 816 completes displaying a frame, it generates the VSYNC pulse input to the CPU 804. With the VSYNC pulse it can alert the CPU 804 or instruct the CPU 804 to begin processing a next frame of the animation.

The display hardware or MDP 816 can include a pulse generation circuit 817 that is in electrical communication with the CPU 804, and in particular in electrical communication with the CPU: application rendering 806 configured to render animation frames and generate rendering commands. The pulse generation circuit 817 generates VSync pulses or clock signals that are received at a pulse input 807 of the CPU: application rendering 806 responsible for rendering animation frames and generating rendering commands These VSync pulses are generated at the refresh rate of the display hardware (f Hz) 816. It serves as an indication to the CPU 804 that the most recent frame has been displayed and that the MDP or display hardware 816 will flip to the next display buffer or frame buffer. Likewise, for a jank-free experience, it is preferable that the composition engine 814 submit or program a new frame buffer to the MDP or display hardware 816 every VSync period. The CPU 804 in turn can use the VSYNC pulses to drive the periodic rendering for a given UI operation (e.g., scroll) ensuring smooth time-based animation sequence.

The display hardware or MDP 816 can also pass the VSync pulses to a Vsync pulse input 809 of the CPU frequency governor 820. The CPU frequency governor 820 can include a switch or module that bases internal clocking on an internal clock signal or on the VSync pulses. When in a second mode of the sampling window, the VSync pulses can be used to trigger the sampling window. In other words, in the second mode the sampling window period and phase will correspond to that of the VSync pulses. Since the CPU: application rendering 806 of the CPU 804 responsible for rendering animation frames and generating rendering commands also triggers off the VSync pulses, in the second mode of the sampling window, the sampling window of the CPU frequency governor 820 can correspond to a start of the CPU 804 processing. In this way, the CPU frequency governor can more quickly respond to sporadic changes in the CPU 804 workload than prior art systems whose sampling window is dictated solely by an internal clock of the CPU frequency governor 820.

Regardless of the sampling window used, the CPU frequency governor receives a CPU workload from the CPU 804, analyzes the workload via one of the two sampling windows, and then provides instructions or a CPU frequency to the CPU clock driver 822 that then provides a CPU frequency or clock signal to the CPU: application rendering 806 of the CPU responsible for rendering animation frames and generating rendering commands. Although many of the figures and descriptions herein have discussed animations of the one or more applications 502, 802, any frames that can cause a sporadic workload on the CPU can replace the herein described animations.

Figure 9:
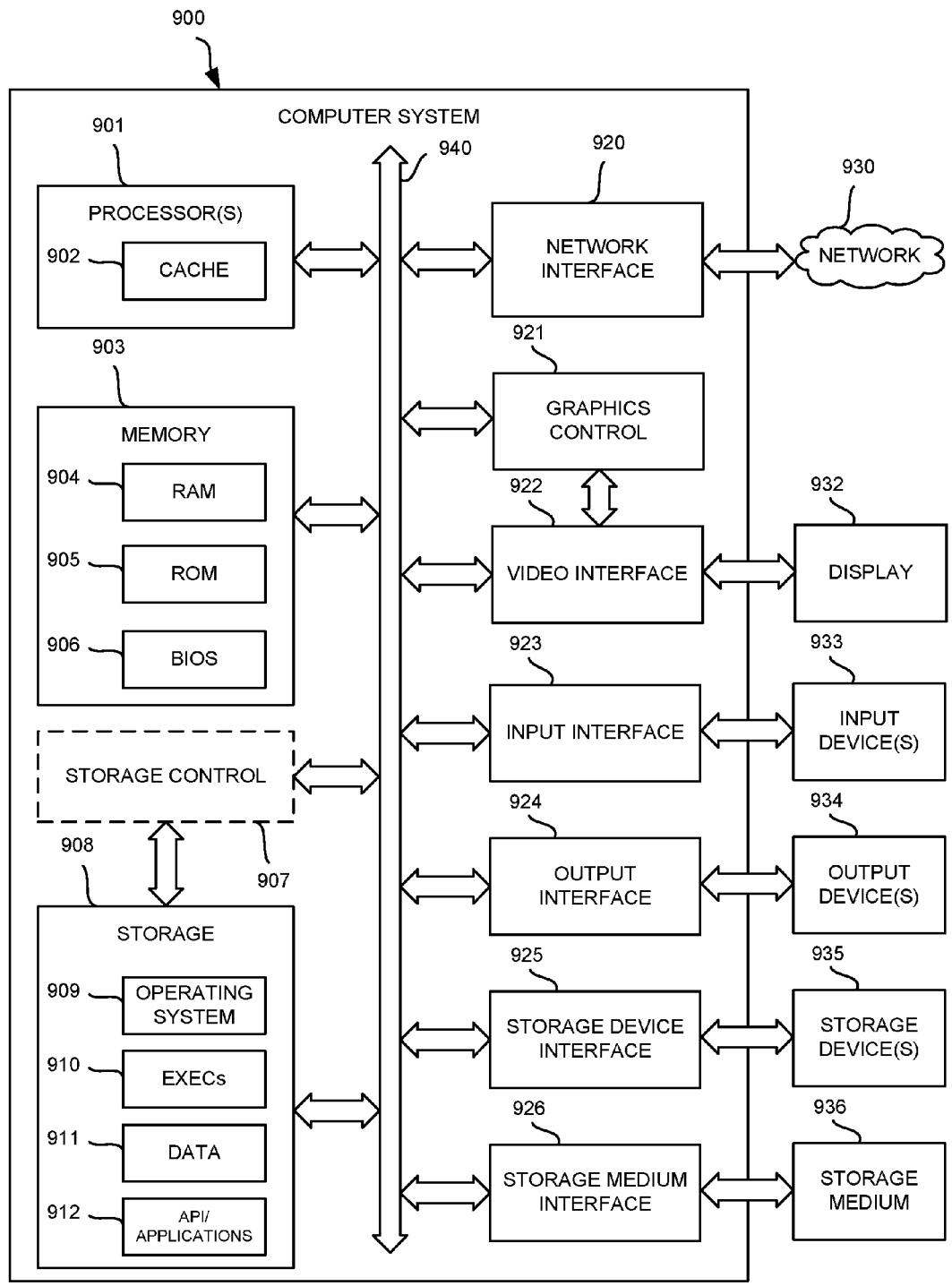
FIG. 9 is one embodiment of a block diagram illustrating components of a computing system configured to implement the methods described in this disclosure

The systems and methods described herein can be implemented in a computer system in addition to the specific physical devices described herein. FIG. 9 shows a diagrammatic representation of one embodiment of a computer system 900 within which a set of instructions can execute for causing a device to perform or execute any one or more of the aspects and/or methodologies of the present disclosure. The computing system 500 in FIG. 5 is one implementation of the computer system 900. The components in FIG. 9 are examples only and do not limit the scope of use or functionality of any hardware, software, firmware, embedded logic component, or a combination of two or more such components implementing particular embodiments of this disclosure. Some or all of the illustrated components can be part of the computer system 900. For instance, the computer system 900 can be a general purpose computer (e.g., a laptop computer) or an embedded logic device (e.g., an FPGA), to name just two non-limiting examples.

Computer system 900 includes at least a processor 901 such as a central processing unit (CPU) or an FPGA to name two non-limiting examples. CPU 522 in FIG. 5 is one implementation of the processor 901. The computer system 900 may also comprise a memory 903 and a storage 908, both communicating with each other, and with other components, via a bus 940. The bus 940 may also link a display 932, one or more input devices 933 (which may, for example, include a keypad, a keyboard, a mouse, a stylus, etc.), one or more output devices 934, one or more storage devices 935, and various non-transitory, tangible computer-readable storage media 936 with each other and with one or more of the processor 901, the memory 903, and the storage 908. All of these elements may interface directly or via one or more interfaces or adaptors to the bus 940. For instance, the various non-transitory, tangible computer-readable storage media 936 can interface with the bus 940 via storage medium interface 926. Computer system 900 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 901 (or central processing unit(s) (CPU(s))) optionally contains a cache memory unit 902 for temporary local storage of instructions, data, or computer addresses. Processor(s) 901 are configured to assist in execution of computer-readable instructions stored on at least one non-transitory, tangible computer-readable storage medium. Computer system 900 may provide functionality as a result of the processor(s) 901 executing software embodied in one or more non-transitory, tangible computer-readable storage media, such as memory 903, storage 908, storage devices 935, and/or storage medium 936 (e.g., read only memory (ROM)). For instance, the method 300 in FIG. 3 and the method 400 in FIG. 4 may be embodied in one or more non-transitory, tangible computer-readable storage media. The non-transitory, tangible computer-readable storage media may store software that implements particular embodiments, such as the methods 300 and 400 and processor(s) 901 may execute the software. Memory 903 may read the software from one or more other non-transitory, tangible computer-readable storage media (such as mass storage device(s) 935, 936) or from one or more other sources through a suitable interface, such as network interface 920. The network interface of the hardware level 534 in FIG. 5 is one embodiment of the network interface 920. The software may cause processor(s) 901 to carry out one or more processes or one or more steps of one or more processes described or illustrated herein. Carrying out such processes or steps may include defining data structures stored in memory 903 and modifying the data structures as directed by the software. In some embodiments, an FPGA can store instructions for carrying out functionality as described in this disclosure (e.g., the methods 300 and 400). In other embodiments, firmware includes instructions for carrying out functionality as described in this disclosure (e.g., the methods 300 and 400).

The memory 903 may include various components (e.g., non-transitory, tangible computer-readable storage media) including, but not limited to, a random access memory component (e.g., RAM 904) (e.g., a static RAM "SRAM", a dynamic RAM "DRAM, etc.), a read-only component (e.g., ROM 905), and any combinations thereof. ROM 905 may act to communicate data and instructions unidirectionally to processor(s) 901, and RAM 904 may act to communicate data and instructions bidirectionally with processor(s) 901. ROM 905 and RAM 904 may include any suitable non-transitory, tangible computer-readable storage media described below. In some instances, ROM 905 and RAM 904 include non-transitory, tangible computer-readable storage media for carrying out the methods 300 and 400. In one example, a basic input/output system 906 (BIOS), including basic routines that help to transfer information between elements within computer system 900, such as during startup, may be stored in the memory 903.

Fixed storage 908 is connected bidirectionally to processor(s) 901, optionally through storage control unit 907. Fixed storage 908 provides additional data storage capacity and may also include any suitable non-transitory, tangible computer-readable media described herein. Storage 908 may be used to store operating system 909, EXECs 910 (executables), data 911, API applications 912 (application programs), and the like. For instance, the storage 908 could be implemented for storage of the sampling window in both the first and second modes as described in FIG. 2. Often, although not always, storage 908 is a secondary storage medium (such as a hard disk) that is slower than primary storage (e.g., memory 903). Storage 908 can also include an optical disk drive, a solid-state memory device (e.g., flash-based systems), or a combination of any of the above. Information in storage 908 may, in appropriate cases, be incorporated as virtual memory in memory 903.

In one example, storage device(s) 935 may be removably interfaced with computer system 900 (e.g., via an external port connector (not shown)) via a storage device interface 925. Particularly, storage device(s) 935 and an associated machine-readable medium may provide nonvolatile and/or volatile storage of machine-readable instructions, data structures, program modules, and/or other data for the computer system 900. In one example, software may reside, completely or partially, within a machine-readable medium on storage device(s) 935. In another example, software may reside, completely or partially, within processor(s) 901.

Bus 940 connects a wide variety of subsystems. Herein, reference to a bus may encompass one or more digital signal lines serving a common function, where appropriate. Bus 940 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 900 may also include an input device 933. In one example, a user of computer system 900 may enter commands and/or other information into computer system 900 via input device(s) 933. Examples of an input device(s) 933 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 933 may be interfaced to bus 940 via any of a variety of input interfaces 923 (e.g., input interface 923) including, but not limited to, serial, parallel, game port, USB, FIREWIRE, THUNDERBOLT, or any combination of the above.

In particular embodiments, when computer system 900 is connected to network 930, computer system 900 may communicate with other devices, such as mobile devices and enterprise systems, connected to network 930. Communications to and from computer system 900 may be sent through network interface 920. For example, network interface 920 may receive incoming communications (such as requests or responses from other devices) in the form of one or more packets (such as Internet Protocol (IP) packets) from network 930, and computer system 900 may store the incoming communications in memory 903 for processing. Computer system 900 may similarly store outgoing communications (such as requests or responses to other devices) in the form of one or more packets in memory 903 and communicated to network 930 from network interface 920. Processor(s) 901 may access these communication packets stored in memory 903 for processing.

Examples of the network interface 920 include, but are not limited to, a network interface card, a modem, and any combination thereof. Examples of a network 930 or network segment 930 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 930, may employ a wired and/or a wireless mode of communication. In general, any network topology may be used.

Information and data can be displayed through a display 932. Examples of a display 932 include, but are not limited to, a liquid crystal display (LCD), an organic liquid crystal display (OLED), a cathode ray tube (CRT), a plasma display, and any combinations thereof. The display 932 can interface to the processor(s) 901, memory 903, and fixed storage 908, as well as other devices, such as input device(s) 933, via the bus 940. The display 932 is linked to the bus 940 via a video interface 922, and transport of data between the display 932 and the bus 940 can be controlled via the graphics control 921.

In addition to a display 932, computer system 900 may include one or more other peripheral output devices 934 including, but not limited to, an audio speaker, a printer, and any combinations thereof. Such peripheral output devices may be connected to the bus 940 via an output interface 924. Examples of an output interface 924 include, but are not limited to, a serial port, a parallel connection, a USB port, a FIREWIRE port, a THUNDERBOLT port, and any combinations thereof.

In addition or as an alternative, computer system 900 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Within this specification, the same reference characters are used to refer to terminals, signal lines, wires, etc. and their corresponding signals. In this regard, the terms "signal," "wire," "connection," "terminal," and "pin" may be used interchangeably, from time-to-time, within the this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein (e.g., the methods 300 and 400) may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A graphics processing system comprising:
   a graphics processing circuit;
   display hardware operating at a refresh rate f, the display hardware including:
      a pulse generation circuit configured to generate pulses; and
   a CPU circuit comprising a CPU frequency governor in electrical communication with the pulse generation circuit, the CPU frequency governor comprising:
      a clock circuit;
      a pulse input in electrical communication with the pulse generation circuit; and
      a sampling window selection submodule configured to select a sampling window for the CPU frequency governor, the sampling window based on a signal from either the clock circuit or the pulse input, the sampling window based on the signal from the pulse input when a workload of the CPU is sporadic.

2. The system of claim 1, further comprising a mode selection submodule in communication with the sampling window selection submodule, the selection submodule to allow either the signal from the clock circuit or the pulse input to reach the sampling window selection submodule.

3. The system of claim 2, wherein the mode selection submodule allows the signal from the pulse input to reach the sampling window selection submodule after a system application programming interface (API) call is received from an application running on the CPU circuit.

4. The system of claim 3, wherein the mode selection submodule maintains selection of the signal from the pulse input for a period of time before allowing the signal from the clock circuit to reach the sampling window selection submodule.

5. The system of claim 3, wherein the mode selection submodule maintains selection of the signal from the pulse input for a variable period of time before allowing the signal from the clock circuit to reach the sampling window selection submodule.

6. The system of claim 5, wherein the variable period of time is a function of a type, quality, or quantity of one or more touch events driven by a touchscreen device having the CPU circuit.

7. A method for reducing stuttering or skipped frames, the method comprising:
   receiving VSync pulses at a CPU frequency governor, the VSync pulses generated by display hardware in communication with the CPU frequency governor;
   processing an animation frame in a CPU to generate a first set of rendering commands;
   processing the first set of rendering commands in a GPU to generate a first set of rendered frames;
   displaying the first set of rendered frames on a display device via the display hardware;
   sampling a CPU workload according to a sampling window and adjusting a frequency of the CPU according to the CPU workload ascertained via the sampling;
   determining that CPU workload has become sporadic, and:

decreasing a period of the sampling window from a period of an internal clock of the CPU frequency governor to a period of the VSync pulses, where the period of the VSync pulses is 1/f, and where f is a refresh rate of the display device; and adjusting a start time of the sampling window to coincide with the VSync pulses.

8. The method of claim 7, wherein f is 60 Hz.

9. The method of claim 7, further comprising increasing the period of the sampling window to the period of the internal clock of the CPU frequency governor, where the period of the internal clock is greater than 1/f, and performing the increasing after a set period of time from when the CPU workload is deemed sporadic.

10. The method of claim 9, wherein determining that the CPU workload has become sporadic is a function of one or more touch events input to the CPU by a touchscreen device having the CPU.

11. The method of claim 7, wherein each instance of the processing the animation frame is coincident with one of the VSync pulses and each instance of the displaying the first set of frames is coincident with the VSync pulses.

12. The method of claim 7, wherein the decreasing a period of the sampling window is triggered by a system API call from an application running on the CPU after the application determines that one or more touch events on the touchscreen device call for an animation to be rendered.

13. A non-transitory, tangible computer readable storage medium, encoded with processor readable instructions to perform a method for reducing stuttering or skipped frames in rendering, the method comprising:

receiving VSync pulses at a pulse input of a CPU frequency governor of a CPU, the VSync pulses received from display hardware;

periodically sampling a CPU workload of the CPU according to a first mode of a sampling window, wherein the sampling window is synchronized with a clock signal from a clock generator of the CPU frequency governor;

monitoring the CPU workload for a change to a sporadic workload;

switching to a second mode of the sampling window when the CPU frequency governor determines that the CPU workload has become sporadic; and periodically sampling the CPU workload according to the second mode, wherein the sampling window is synchronized with the VSync pulses from the pulse input of the CPU frequency governor.

14. The non-transitory, tangible computer readable storage medium of claim 13, further comprising maintaining the second mode of the sampling window for a fixed period of time.

15. The non-transitory, tangible computer readable storage medium of claim 13, further comprising triggering the switching with a system API call, from an application running on the CPU, to the CPU frequency governor.

16. The non-transitory, tangible computer readable storage medium of claim 13, wherein a default sampling window of the CPU frequency governor is greater than 1/f, where f is a refresh rate of a display device and where the VSync pulses have a frequency equal to f Hz.

17. A system for reducing stuttering or skipped frames in rendering, the system comprising:

means for receiving VSync pulses at a pulse input of a CPU frequency governor of a CPU, the VSync pulses received from display hardware;

means for periodically sampling a CPU workload of the CPU according to a first mode of a sampling window, wherein the sampling window is synchronized with a clock signal from a clock generator of the CPU frequency governor;

means for monitoring the CPU workload for a change to a sporadic workload;

means for switching to a second mode of the sampling window when the CPU frequency governor determines that the CPU workload has become sporadic; and means for periodically sampling the CPU workload according to the second mode, wherein the sampling window is synchronized with the VSync pulses from the pulse input of the CPU frequency governor.

18. The system of claim 17, further comprising a means for maintaining the second mode of the sampling window for a fixed period of time.

19. The system of claim 17, further comprising triggering the switching with a system API call, from an application running on the CPU, to the CPU frequency governor.

* * * * *